United States Patent
Lin et al.

(10) Patent No.: US 9,444,957 B2
(45) Date of Patent: Sep. 13, 2016

(54) PORTABLE SCANNING DEVICE

(71) Applicants: Sintai Optical (Shenzhen) Co., Ltd., Guang Dong Province (CN); Asia Optical Co., Inc., Taichung (TW)

(72) Inventors: Hsien-Chi Lin, Taichung (TW); Shao-Kang Liu, Taichung (TW)

(73) Assignees: Asia Optical Co., Inc., Taichung (TW); Sintai Optical (Shenzhen) Co., Ltd., Shen Zhen, Guang Dong Province (CN)

( * ) Notice: Subject to any disclaimer, the term of this patent is extended or adjusted under 35 U.S.C. 154(b) by 18 days.

(21) Appl. No.: 14/739,121

(22) Filed: Jun. 15, 2015

(65) Prior Publication Data

US 2015/0365549 A1    Dec. 17, 2015

(30) Foreign Application Priority Data

Jun. 17, 2014  (TW) .............................. 103120857 A

(51) Int. Cl.
   *H04N 1/04* (2006.01)
   *H04N 1/00* (2006.01)
   *H04N 1/12* (2006.01)

(52) U.S. Cl.
   CPC ...... *H04N 1/00525* (2013.01); *H04N 1/00557* (2013.01); *H04N 1/121* (2013.01)

(58) Field of Classification Search
   CPC ..................... H04N 1/00525; H04N 1/00557; H04N 1/121
   USPC ......... 358/473, 472, 474, 496, 498; 382/313
   See application file for complete search history.

(56) References Cited

U.S. PATENT DOCUMENTS

| | | | | |
|---|---|---|---|---|
| 4,962,526 A | * | 10/1990 | Kotani ............... | H04N 1/00384 358/473 |
| 4,989,237 A | * | 1/1991 | Kotani ................... | H04M 1/02 358/473 |
| 5,172,243 A | * | 12/1992 | Hayashi .............. | H04M 1/2755 358/400 |
| 5,412,490 A | * | 5/1995 | Kojima ................... | B41J 11/48 358/473 |
| 5,602,650 A | * | 2/1997 | Tamura ................. | G06F 1/1616 358/400 |
| 5,644,663 A | * | 7/1997 | Saito .................. | H04N 1/00519 358/473 |
| 5,825,505 A | * | 10/1998 | Toyoda .............. | H04N 1/00538 358/400 |
| 5,889,597 A | * | 3/1999 | Ara ..................... | H04N 1/00236 358/296 |
| 6,104,508 A | * | 8/2000 | Miyazaki ........... | H04N 1/00352 358/404 |
| 6,346,996 B1 | * | 2/2002 | Uchiyama .......... | H04N 1/00538 358/473 |
| 6,791,719 B1 | * | 9/2004 | Hisada ............... | H04N 1/00347 358/400 |
| 6,801,344 B2 | * | 10/2004 | Morinaga .......... | H04N 1/00525 358/473 |

(Continued)

*Primary Examiner* — Cheukfan Lee
(74) *Attorney, Agent, or Firm* — Trop Pruner & Hu, P.C.

(57) ABSTRACT

A portable scanning device includes a docking seat, a handheld scanner, a positioning unit, a document-feeding unit and a motor. The docking seat has a receiving groove, a feeding groove, a document inlet, and a document outlet. The positioning unit is mounted to the docking seat for retaining the handheld scanner in the receiving groove. The document-feeding unit includes a loading subunit for conveying a document from the feeding groove to the handheld scanner through the document inlet, a discharging subunit for discharging the document via the document outlet, and a regulating subunit for continuous document-feeding action when a plurality of the documents are scanned. The motor is for actuating movement of the document-feeding unit.

12 Claims, 9 Drawing Sheets

(56) References Cited

U.S. PATENT DOCUMENTS

| | | | | |
|---|---|---|---|---|
| 7,088,475 B1 * | 8/2006 | Terashima | ......... | H04N 1/00525 271/121 |
| 7,133,169 B2 * | 11/2006 | Terashima | ............... | H04N 1/00 271/3.14 |
| 8,844,925 B1 * | 9/2014 | Chiu | ...................... | B65H 31/34 271/171 |
| 8,913,305 B2 * | 12/2014 | Yoshioka | ............ | H04N 1/00496 358/474 |
| 2001/0015829 A1 * | 8/2001 | Veigl | .................. | H04N 1/00538 358/474 |
| 2005/0286091 A1 * | 12/2005 | Harel | .................. | H04N 1/00127 358/474 |
| 2010/0321745 A1 * | 12/2010 | Van Os | ................ | H04N 1/0049 358/498 |

* cited by examiner

PORTABLE SCANNING DEVICE

CROSS-REFERENCE TO RELATED APPLICATION

This application claims priority to Taiwanese Application No. 103120857, filed on Jun. 17, 2014.

FIELD

The disclosure relates to a scanner device, and more particularly to a portable scanner device.

BACKGROUND

As disclosed in Taiwanese Utility Model Patent No. M424555, a conventional portable scanner device includes a docking seat and a handheld scanner detachably mounted to the docking seat. When information from a book or an immovable plane requires scanning, the handheld scanner is detached from the docking seat for scanning. Alternatively, when the handheld scanner is mounted to the docking seat, a document can be fed into the docking seat so that the handheld can scan the document and store the scanning information.

However, the conventional portable scanner device may have the following drawbacks:

1. It is inconvenient for the conventional portable scanner device to scan a plurality of documents since it requires a user to feed the documents one by one to the docking seat.

2. The handheld scanner of the conventional portable scanner device is vulnerable since it is mounted to the docking seat without any securing or protective mechanism. During transportation of the conventional portable scanner device, the handheld scanner may easily detach from the docking seat or suffer impact with foreign matter and be damaged. In addition, dust accumulated on the handheld scanner may also cause damage thereto.

SUMMARY

Therefore, an object of the disclosure is to provide a portable scanner device that can eliminate the drawbacks of the prior art.

According to the disclosure, the portable scanning device includes a docking seat, a handheld scanner, a positioning unit, a document-feeding unit and a motor.

The docking seat has a receiving groove, a feeding groove, a document inlet and a document outlet. The feeding groove is spaced apart from the receiving groove and is adapted for receiving a document therein. The document inlet spatially communicates the receiving groove with the feeding groove. The document outlet spatially communicates the receiving groove with the external environment.

The handheld scanner is received detachably in the receiving groove.

The positioning unit is mounted to the docking seat and is operable for retaining the handheld scanner in the receiving groove.

The document-feeding unit is mounted to the docking seat, and includes a loading subunit, a discharging subunit and a regulating subunit. The loading subunit that is adapted for conveying the document from the feeding groove to the handheld scanner through the document inlet. The discharging subunit is adapted for discharging the document via the document outlet. The regulating subunit that is disposed for ensuring the smoothness of continuous document-feeding action when a plurality of the documents are scanned.

The motor is for actuating movement of the document-feeding unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
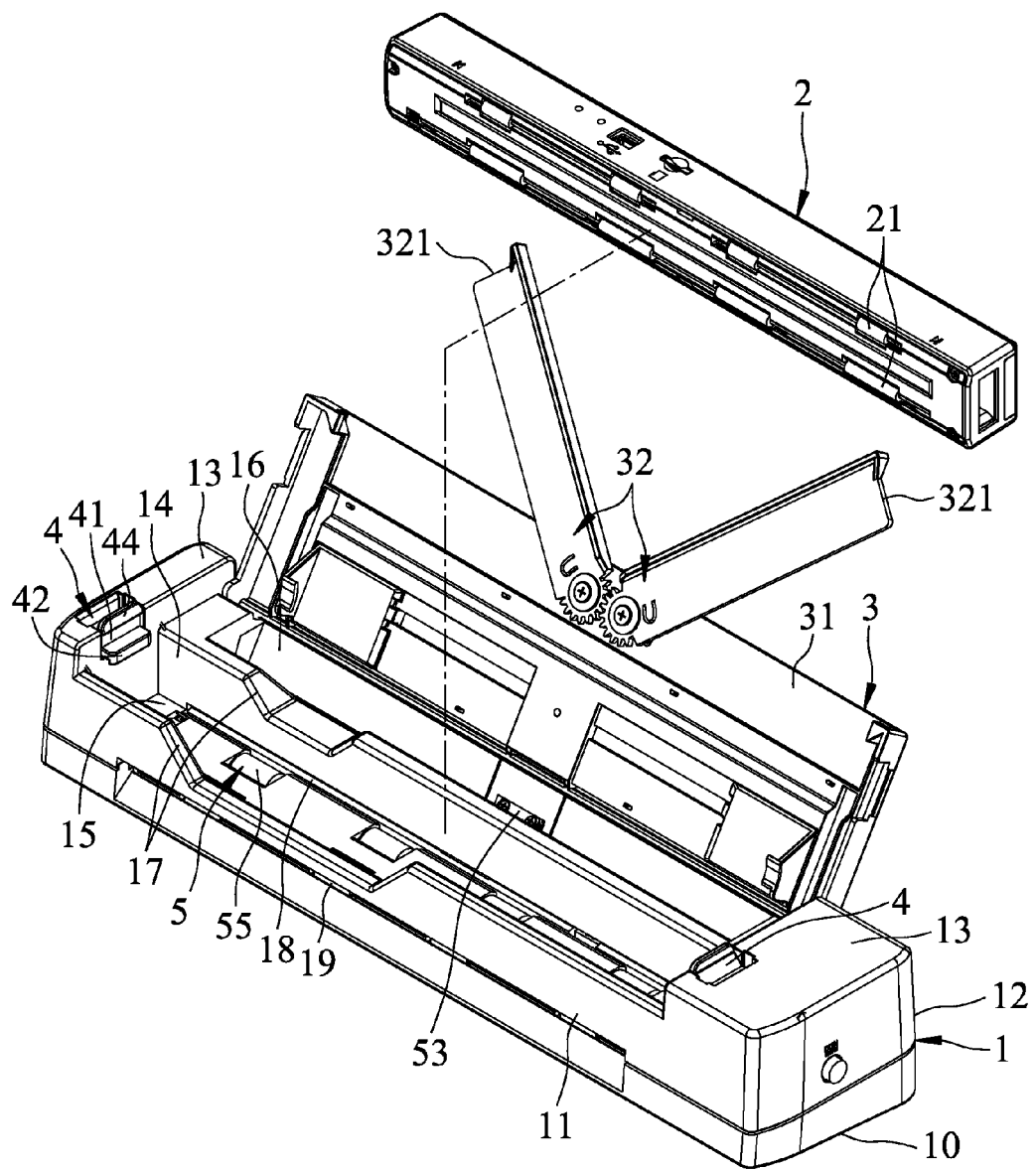
FIG. 1 is a partly exploded perspective view illustrating an embodiment of a portable scanning device according to the disclosure.

Referring to FIGS. 1 to 4, an embodiment of a portable scanner device according to the disclosure is illustrated. The portable scanner device includes a docking seat 1, a handheld scanner 2, a protecting cover 3, a positioning unit 4, a document-feeding unit 5 and a motor 60.

Figure 2:
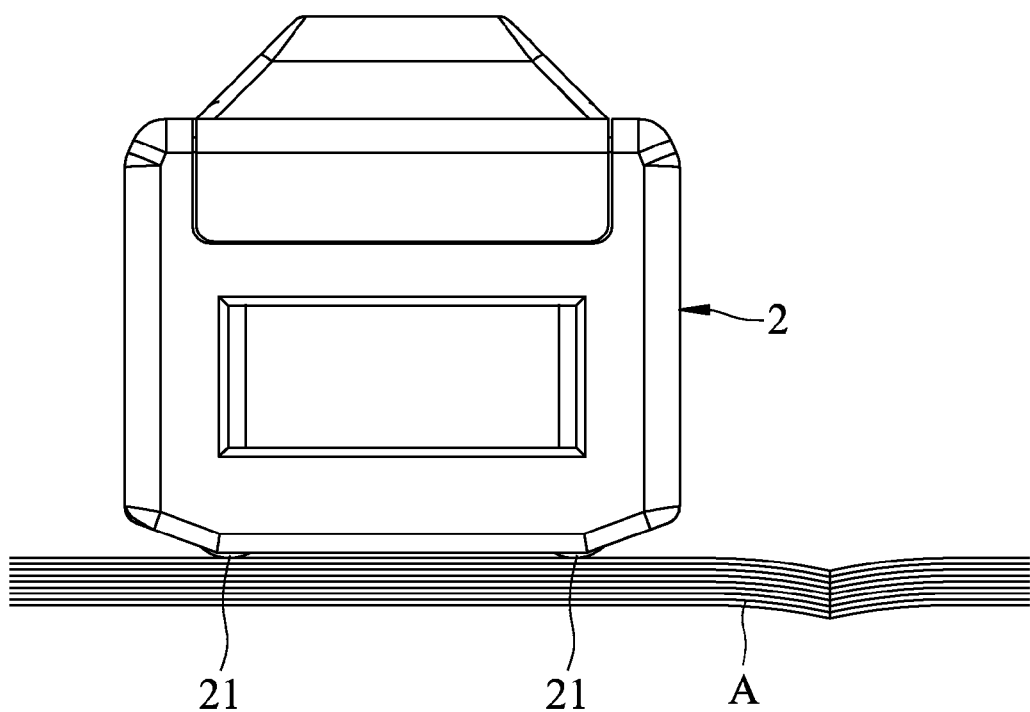
FIG. 2 is a side view illustrating use of a handheld scanner of the embodiment.
Figure 3:
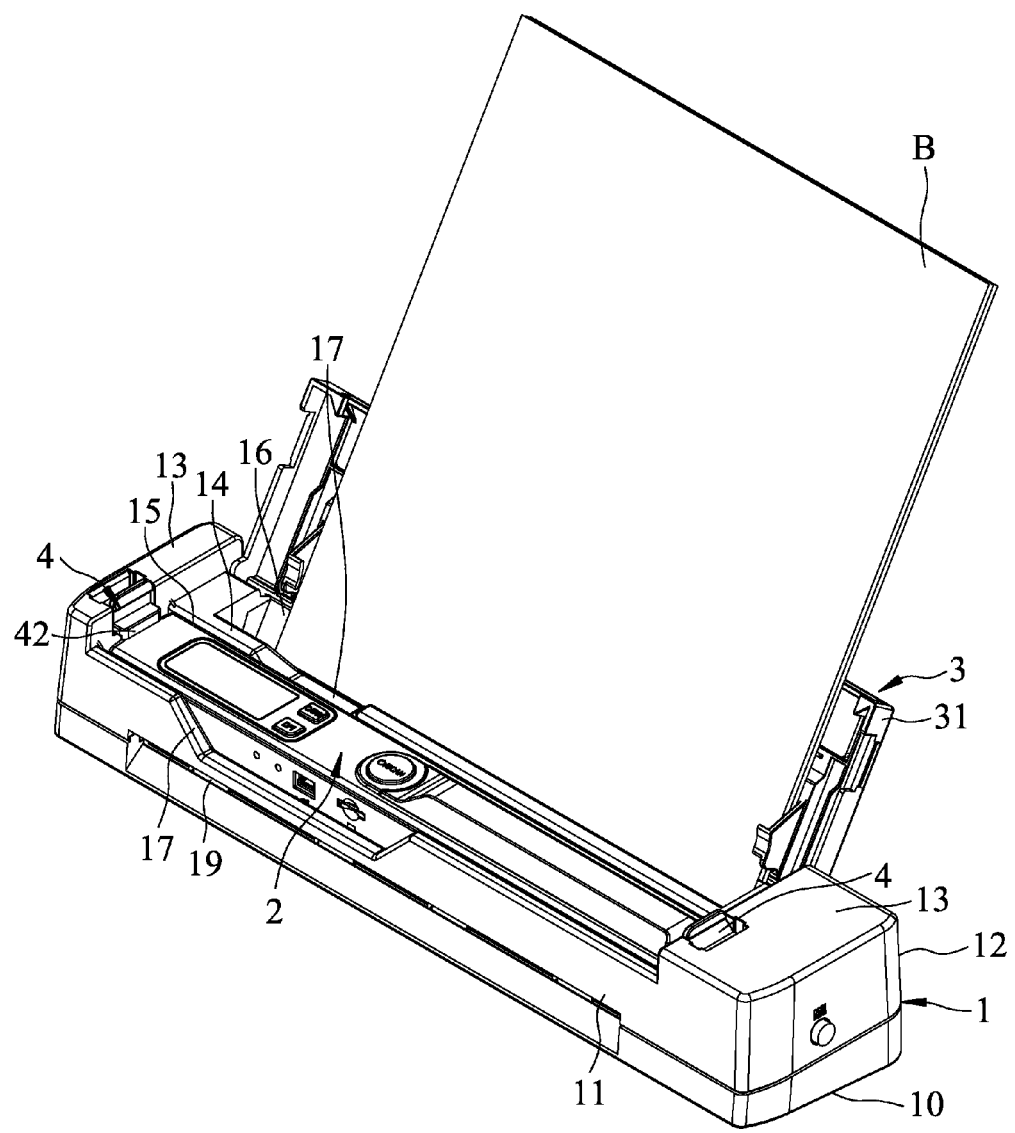
FIG. 3 is a perspective view illustrating the embodiment when used to scan a plurality of documents.

As shown in FIGS. 1 to 3, the docking seat 1 has a bottom segment 10, a front segment 11 connected to a front edge of the bottom segment 10 and formed with a document outlet 19, a rear segment 12 connected to a rear edge of the bottom segment 10, two side segments 13 connected respectively to opposite lateral ends of the bottom segment 10, and a dividing segment 14 disposed between the front and rear segments 11, 12 and formed with a document inlet 18. The front segment 11, the dividing segment 14 and the side segments 13 cooperatively define a receiving groove 15. The dividing segment 14, the rear segment 12 and the side segments 13 cooperatively define a feeding groove 16. In this embodiment, the feeding groove 16 is spaced apart from the receiving groove 15 and is adapted for receiving a plurality of documents (B) therein. The document inlet 18 spatially communicates the receiving groove 15 with the feeding groove 16. The document outlet 19 spatially communicates the receiving groove 15 with the external environment outside of the docking seat 1. The handheld scanner 2 is received detachably in the receiving groove 15. The docking seat 1 further has two recesses 17 that are formed respectively in the front segment 11 and the dividing segment 14 and that are close to each other for facilitating access to the handheld scanner 2. During the scanning process, the documents (B) enter the receiving groove 15 via the document inlet 18, and exit the receiving groove 15 to the external environment via the document outlet 19.

Figure 7:
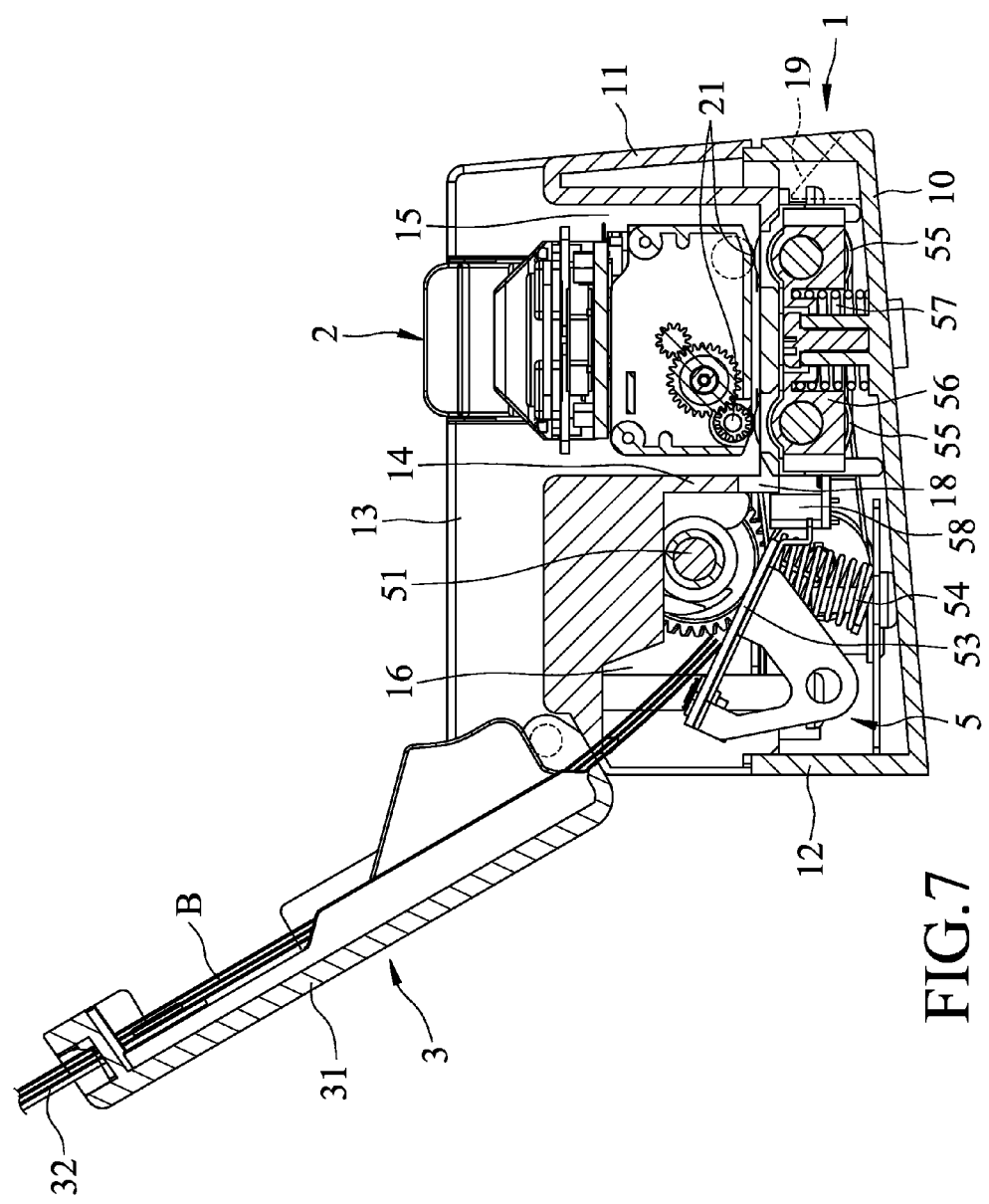
FIG. 7 is an assembled sectional view of the embodiment.

As shown in FIGS. 1, 2 and 7, the handheld scanner 2 includes two scanner rollers 21. In order to scan information from a book (A) (see FIG. 2) or an immovable plane, the handheld scanner 2 is detached from the receiving groove 15 of the docking seat 1.

Figure 8:
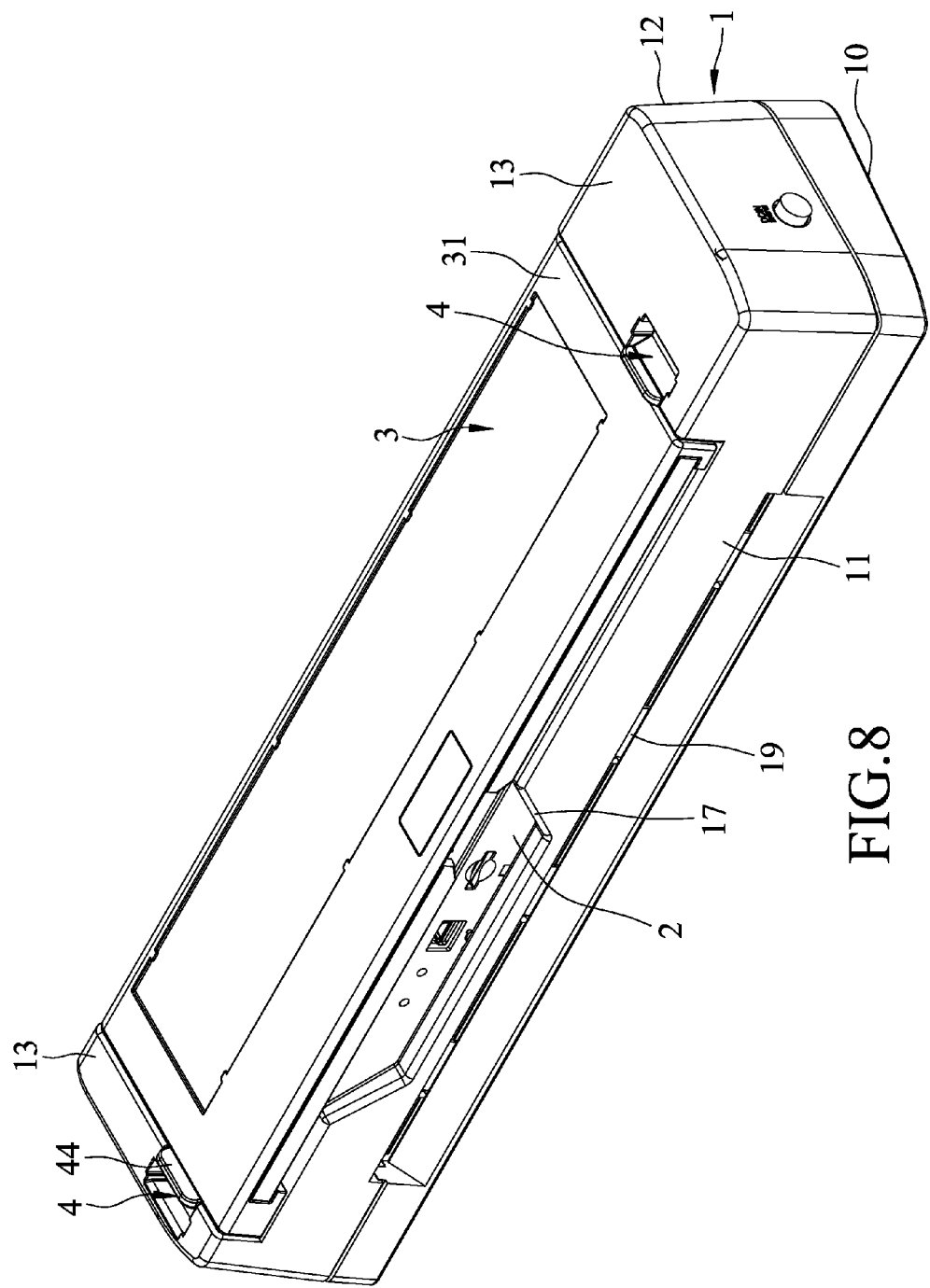
FIG. 8 is a perspective view of the embodiment illustrating a protecting cover at a covered position.
Figure 9:
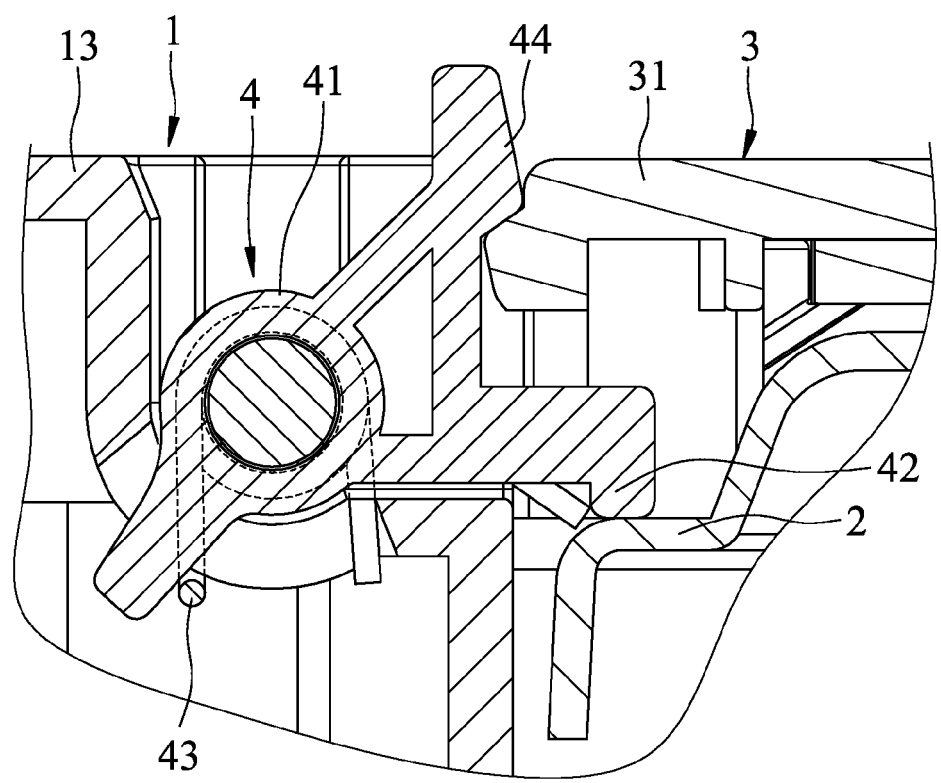
FIG. 9 is fragmentary sectional view of the embodiment illustrating a pivot component of a positioning unit.

Referring to FIGS. 1, 3 and 8, the protecting cover 3 has a cover body 31 connected pivotally to the rear segment 12 of the docking seat 1, and two back support bars 32 connected pivotally to the cover body 31. The protecting cover 3 is pivotable between a covered position (see FIG. 8) to cover the receiving groove 15 and the feeding groove 16, and an opened position (see FIGS. 3 and 7) to uncover the receiving groove 15 and the feeding groove 16 in an upright manner. When the protecting cover 3 is at the opened position, the documents (B) are allowed to be loaded into the feeding groove 16, while the protecting cover 3 serves as a support for the documents (B). When the protecting cover 3 is at the covered position, the handheld scanner 2 is prevented from falling out of the receiving groove 15 or being directly hit by foreign matters, and dust can also be prevented from accumulating in the receiving groove 15 or the feeding groove 16. In this embodiment, each of the back support bars 32 is pivoted to a free end portion of the cover body 31, and has a free end 321. The free ends 321 of the back support bars 32 are displaceable to be away from the cover body 31 to form a V-shaped structure via pivot action of the back support bars 32 when the protecting cover 3 is at the opened position so as to serve as an extension of the cover body 31 for holding documents of larger sizes. The free ends 321 of the back support bars 32 are retracted to be close to the cover body 31 to permit the protecting cover 3 to be moved from the opened position to the covered position.

Referring to FIGS. 1, 3, 8 and 9, the positioning unit 4 is mounted to the docking seat 1 and operable for retaining the handheld scanner 2 in the receiving groove 15. Specifically, the positioning unit 4 includes two pivot components 41, two first retaining components 42, two resilient components 43 and two second retaining components 44. The pivot components 41 are connected pivotally and respectively to the side segments 13 of the docking seat 1. The first retaining components 42 extend respectively from the pivot components 41. The resilient components 43 are sleeved respectively on the pivot components 41. The second retaining components 44 extend respectively from the pivot components 41. In this embodiment, each of the resilient members 43 is a torsion spring. The positioning unit 4 is convertible between an unlocked state, where the pivot components 41 are pivoted relative to the side segments 13 to move the first retaining components 42 away from the handheld scanner 2 against resilient forces of the resilient components 43, and a locked state (see FIGS. 8 and 9), where the pivot components 41 are biased by the resilient components 43 to move the first retaining components 42 to abut against the handheld scanner 2 for stabilizing the scanning quality. In addition, the second retaining components 44 abut against the cover body 31 of the protecting cover 3 when the protecting cover 3 is at the covered position and the positioning unit 4 is at the locked state, thereby locking the protecting cover 3 at the covered position. In use, a user can easily actuate the pivot action of the pivot components 41 by pushing the second retaining components 44.

Figure 4:
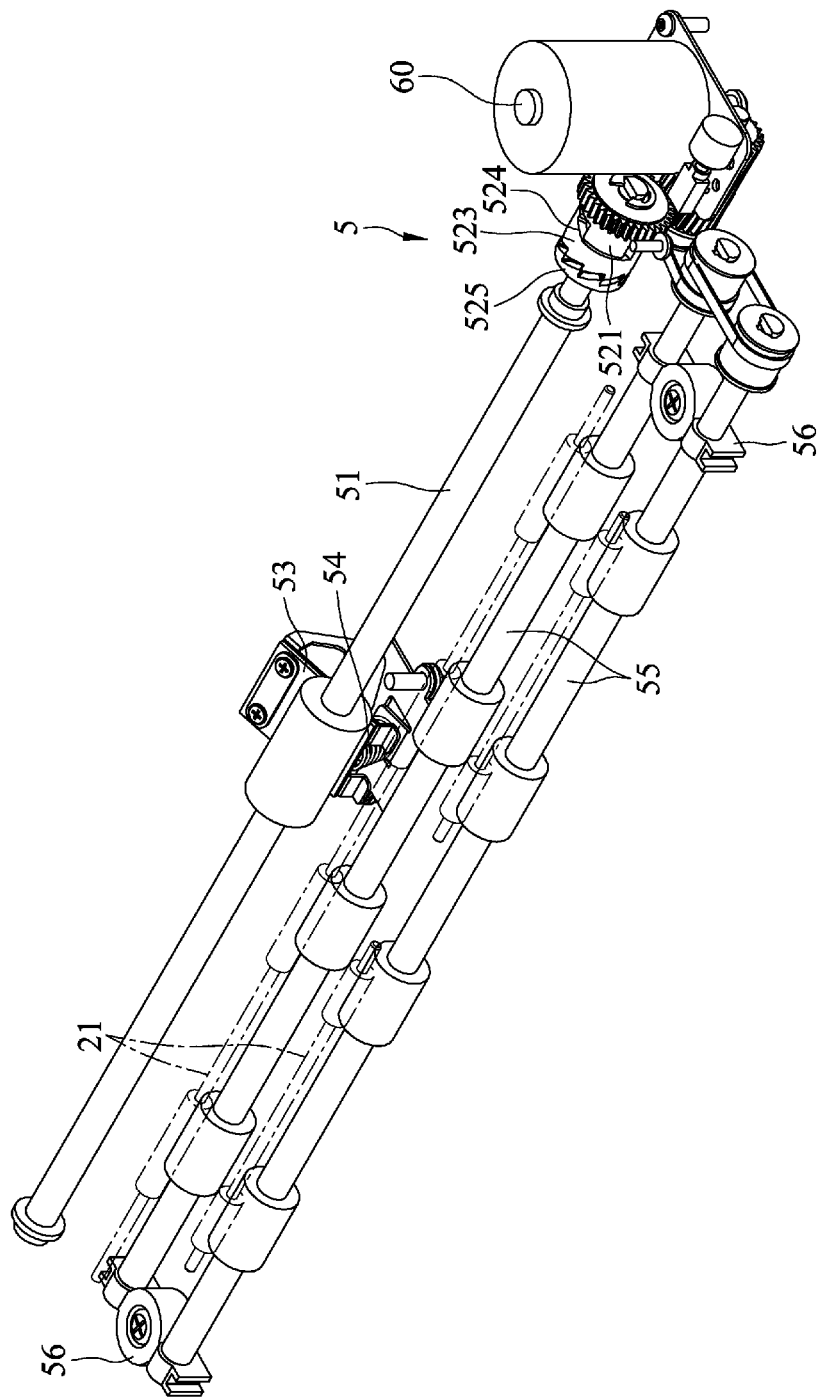
FIG. 4 is a perspective view of a document-feeding unit and a motor of the embodiment.

Referring to FIGS. 1, 4 and 7, the document-feeding unit 5 is mounted to the docking seat 1, and includes a loading subunit, a discharging subunit and a regulating subunit. The loading subunit is adapted for conveying the documents (B) from the feeding groove 16 to the handheld scanner 2 through the document inlet 18. The discharging subunit is adapted for discharging the documents (B) via the document outlet 19. The regulating subunit is disposed for ensuring the smoothness of continuous document-feeding action during the scanning of the documents (B). In this embodiment, the loading subunit of the document-feeding unit 5 includes a loading roller 51, a friction pad 53, a loading spring 54 and a detector 58. The loading roller 51 is disposed in the feeding groove 16 and is driven rotatably by the motor 60. The friction pad 53 is disposed movably adjacent to the loading roller 51. The loading spring 54 is disposed under the friction pad 53 (i.e., between the friction pad 53 and the bottom segment 10 of the docking seat 1) and biases resiliently the friction pad 53 toward the loading roller 51. A friction force is generated between the friction pad 53 and the documents (B) to retain the documents (B) thereon (except for the to-be-scanned sheet of the documents (B)) so as to prevent multiple sheets of the documents (B) from being scanned at the same time. The detector 58 is disposed between the friction pad 53 and the document inlet 18 (see FIG. 7) for detecting entry of the documents (B) into the receiving groove 15, actuating the handheld scanner 2, and generating paging signals. The discharging subunit of the document-feeding unit 5 includes two discharging rollers 55, two spaced-apart linking members 56 and two urging members 57. The discharging rollers 55 are disposed in the receiving groove 15, are driven rotatably by the motor 60, and abut respectively and rotatably the scanner rollers 21 of the handheld scanner 2. In this embodiment, the discharging rollers 55 of the discharging subunit of the document-feeding unit 5 are elongated, extend in a left-right direction, and are disposed respectively under the scanner rollers 21 of the handheld scanner 2. One of the linking members 56 links left end portions of the discharging rollers 55. The other one of the linking members 56 links right end portions of the discharging rollers 55. One of the urging members 57 is disposed between the bottom segment 10 and one of the linking members 56. The other one of the urging members 57 is disposed between the bottom segment 10 and the other one of the linking members 56. The urging members 57 urge the discharging rollers 55 toward the scanner rollers 21. As such, the discharging rollers 55 and the scanner rollers 21 synchronously rotate, and each sheet of the documents (B) can be brought closer against to the handheld scanner 2 for ensuring the scanning quality. In addition, the regulating subunit of the document-feeding unit 5 is configured as a ratchet mechanism disposed between the motor 60 and the loading roller 51. The loading roller 51 is driven to rotate by the regulating subunit at a linear speed slower than that of the discharging rollers 55 when the regulating subunit engages the loading roller 51 with the motor during the document-feeding action before the document reaches the discharging rollers 55.

It should be noted that the motor 60 may be disposed in the handheld scanner 2. For example, the motor 60 may drive the scanner rollers 21 to rotate, thereby driving rotation of the discharging rollers 55 and the loading roller 51.

Figure 5:
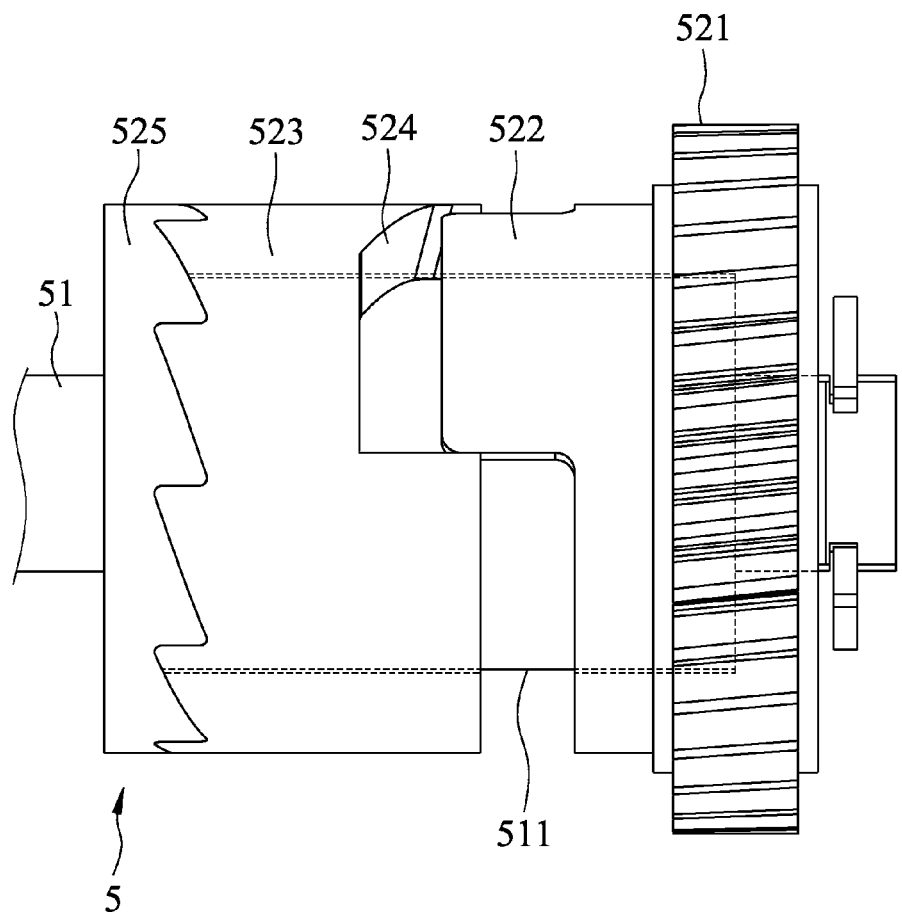
FIG. 5 is a top view of a regulating subunit of the document-feeding unit of the embodiment in an engaging state.
Figure 6:
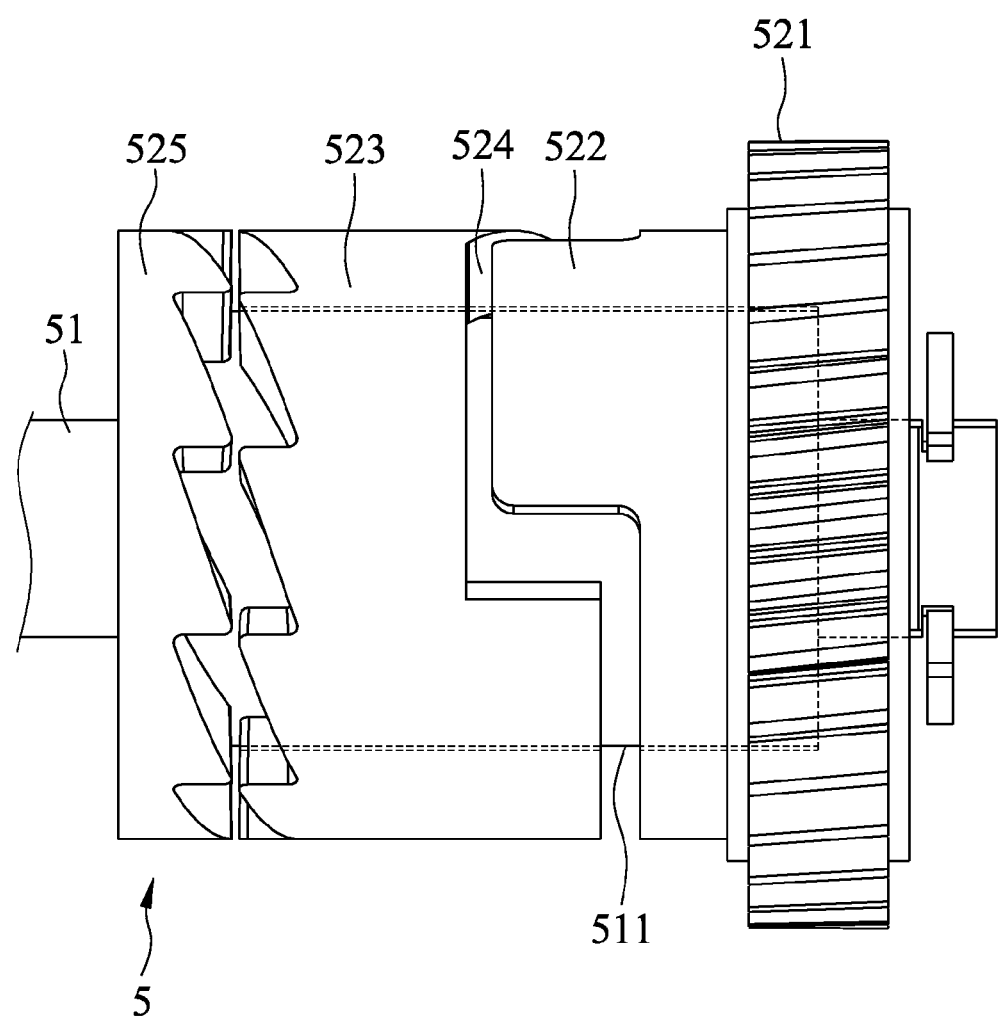
FIG. 6 is a top view of the regulating subunit of the document-feeding unit of the embodiment in an unengaging state.

Referring to FIGS. 5 and 6, in this embodiment, the loading roller 51 of the loading subunit is rotatable about an axis which extends in the left-right direction, and has a rotating shaft 511 extending along the axis. The regulating subunit includes a driving gear 521, an engaging block 522, an engaging gear 523 and a ratchet member 525. The riving gear 521 is driven rotatably by the motor 60 and is coaxial with the loading roller 51. The engaging block 522 projects from the driving gear 521. The engaging gear 523 is sleeved rotatably on the rotating shaft 511 of the loading roller 51 and is formed with a cam surface 524 that faces the engaging block 522. The ratchet member 525 is formed co-rotatably on said loading roller 51. The engaging gear 523 is slidable along and rotatable about the axis relative to the loading roller 51. The regulating subunit is convertible between an engaging state (see FIG. 5), where the engaging gear 523 engages the ratchet member 525 so that the loading roller 51 is driven to rotate by the driving gear 521, and an unengaging state (see FIG. 6), where the engaging gear 523 is urged by the ratchet member 525 to move away from the ratchet member 525 toward the driving gear 521 so that the loading roller 51 rotates independently from the driving gear 521. Specifically, in the beginning of the scanning process when each sheet of the documents (B) is not yet conveyed from the driving roller 51 to the discharging rollers 55, the driving gear 521 and the engaging block 522 of the regulating subunit are directly driven to rotate by the motor 60, and the engaging gear 523 is driven to move due to slidable contact between the engaging block 522 and the cam surface 524, and eventually turns the regulating subunit to the engaging state. As each sheet of the documents (B) reaches the discharging rollers 55, the loading roller 51 is driven to rotate faster and synchronously with the discharging rollers 55. Consequently, the ratchet mechanism between the ratchet member 525 and the engaging gear 523 drives the engaging gear 523 to be disengaged from the ratchet member 525, so that the loading roller 51 rotates independently from the driving gear 521. As each sheet of the documents (B) passes entirely through the loading roller 51, the linear speed of the loading roller 51 becomes zero. Subsequently, the engaging gear 523 would be driven to once again engage the ratchet member 525, thereby rotating the loading roller 51 for conveyance of the next sheet of the documents (B). By virtue of the regulating subunit, sheet-by-sheet scanning of the documents (B) can be properly conducted.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A portable scanning device comprising:
    a docking seat having
        a receiving groove,
        a feeding groove that is spaced apart from said receiving groove and that is adapted for receiving a document therein,
        a document inlet that spatially communicates said receiving groove with said feeding groove, and
        a document outlet that spatially communicates said receiving groove with the external environment;
    a handheld scanner received detachably in said receiving groove;
    a positioning unit mounted to said docking seat and operable for retaining said handheld scanner in said receiving groove;
    a document-feeding unit mounted to said docking seat, and including
        a loading subunit that is adapted for conveying the document from said feeding groove to said handheld scanner through said document inlet,
        a discharging subunit that is adapted for discharging the document via said document outlet, and
        a regulating subunit that is disposed for ensuring the smoothness of continuous document-feeding action when a plurality of the documents are scanned; and
    a motor for actuating movement of said document-feeding unit.

2. The portable scanning device as claimed in claim 1, wherein said docking seat includes a bottom segment, a front segment connected to a front edge of said bottom segment and formed with said document outlet, a rear segment connected to a rear edge of said bottom segment, two side segments connected respectively to opposite lateral ends of said bottom segment, and a dividing segment disposed between said front and rear segments and formed with said document inlet, said front segment, said dividing segment and said side segments cooperatively defining said receiving groove, said dividing segment, said rear segment and said side segments cooperatively defining said feeding groove.

3. The portable scanning device as claimed in claim 2, wherein said docking seat further has two recesses formed respectively in said front segment and said dividing segment for facilitating access to said handheld scanner.

4. The portable scanning device as claimed in claim 2, further comprising a protecting cover that has a cover body connected pivotally to said rear segment of said docking seat, said protecting cover being pivotable between a covered position to cover said receiving groove and said feeding groove, and an opened position to uncover said receiving groove and said feeding groove in an upright manner.

5. The portable scanning device as claimed in claim 4, wherein said protecting cover further has two back support bars connected pivotally to said cover body, each of said back support bars having a free end, said free ends of said back support bars being displaceable to be away from said cover body via pivot action of said back support bars when said protecting cover is at the opened position, and being retracted to be close to said cover body when said protecting cover is at the covered position.

6. The portable scanning device as claimed in claim 4, wherein:
    said positioning unit includes
        two pivot components connected pivotally and respectively to said side segments of said docking seat,
        two first retaining components extending respectively from said pivot components, and
        two resilient components sleeved respectively on said pivot components; and
    said positioning unit being convertible between an unlocked state, where said pivot components are pivoted to move said first retaining components away from said handheld scanner against resilient forces of said resilient components, and an locked state, where said pivot components are biased by said resilient components to move said first retaining components to abut against said handheld scanner.

7. The portable scanning device as claimed in claim 6, wherein said positioning unit further includes two second retaining components extending respectively from said pivot components, said second retaining components abutting against said cover body of said protecting cover when said protecting cover is at the covered position and said positioning unit is at the locked state.

8. The portable scanning device as claimed in claim 1, wherein said loading subunit of said document-feeding unit includes:
    a loading roller disposed in said feeding groove and driven rotatably by said motor;

a friction pad disposed movably adjacent to said loading roller; and a loading spring disposed under said friction pad and biasing resiliently said friction pad toward said loading roller.

9. The portable scanning device as claimed in claim 8, wherein:

said handheld scanner includes two scanner rollers; and said discharging subunit of said document-feeding unit includes two discharging rollers disposed in said receiving groove, driven rotatably by said motor, and abutting respectively and rotatably said scanner rollers of said handheld scanner.

10. The portable scanning device as claimed in claim 9, wherein:

said discharging rollers of said discharging subunit of said document-feeding unit are elongated, extend in a left-right direction, and are disposed respectively under said scanner rollers; and said discharging subunit of said document-feeding unit further includes two spaced-apart linking members, one of said linking members linking left end portions of said discharging rollers, the other one of said linking members linking right end portions of said discharging rollers, and two urging members, one of said urging members being disposed between said bottom segment and one of said linking members, the other one of said urging members being disposed between said bottom segment and the other one of said linking members, said urging members urging said discharging rollers toward said scanner rollers.

11. The portable scanning device as claimed in claim 9, wherein:

said regulating subunit of said document-feeding unit is configured as a ratchet mechanism disposed between said motor and said loading roller;

said loading roller being driven to rotate by said regulating subunit at a linear speed slower than that of said discharging rollers when said regulating subunit engages said loading roller with said motor during the document-feeding action before the document reaches said discharging rollers; and said loading roller being driven to rotate synchronously with said discharging rollers and being disengaged from said regulating subunit during the document-feeding action after the document reaches said discharging rollers.

12. The portable scanning device as claimed in claim 11, wherein:

said loading roller of said loading subunit is rotatable about an axis, and has a rotating shaft extending along the axis;

said regulating subunit includes a driving gear driven rotatably by said motor and being coaxial with said loading roller, an engaging block projecting from said driving gear, an engaging gear sleeved rotatably on said rotating shaft of said loading roller, movable along the axis relative to said loading roller, and formed with a cam surface, and a ratchet member formed co-rotatably on said loading roller; and said regulating subunit being convertible between an engaging state, where said engaging gear is moved due to slidable contact between said engaging block and said cam surface and engages said ratchet member so that said loading roller is driven to rotate by said driving gear, and an unengaging state, where said engaging gear is urged by said ratchet member to move away from said ratchet member toward said driving gear so that said loading roller rotates independently from said driving gear.

* * * * *